Figure 1A:
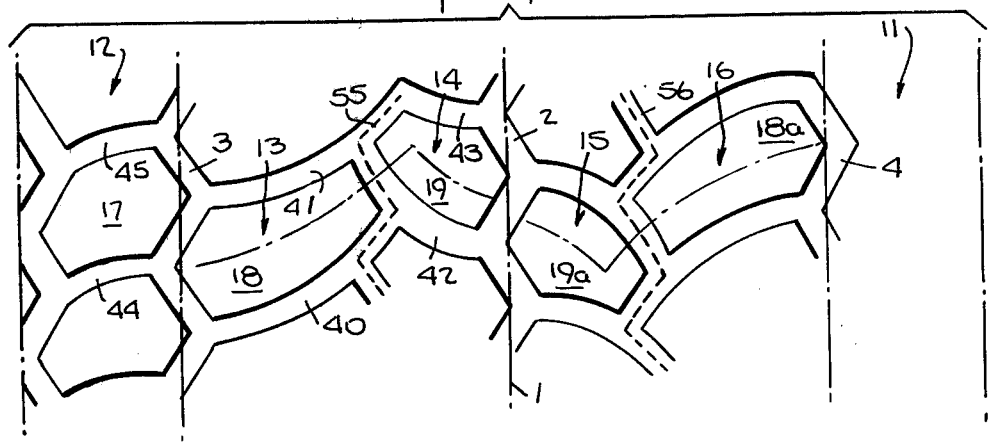

United States Patent [19]

Poque

[11] 4,166,490
[45] * Sep. 4, 1979

[54] PNEUMATIC RADIAL TIRE

[75] Inventor: Dionysius J. Poque, Aachen, Fed. Rep. of Germany

[73] Assignee: Uniroyal GmbH, Aachen, Fed. Rep. of Germany

[*] Notice: The portion of the term of this patent subsequent to Jan. 23, 1993, has been disclaimed.

[21] Appl. No.: 800,136

[22] Filed: May 24, 1977

[30] Foreign Application Priority Data

Nov. 30, 1976 [DE] Fed. Rep. of Germany ............. 3156
Dec. 23, 1976 [DE] Fed. Rep. of Germany ............. 3159
Mar. 11, 1977 [DE] Fed. Rep. of Germany ....... 2710825

[51] Int. Cl.² .............................................. B60C 11/06
[52] U.S. Cl. ............................... 152/209 R; D12/149; D12/151
[58] Field of Search ..................... 152/209 R; D12/136-137, 149, 151

[56] References Cited

U.S. PATENT DOCUMENTS

| D. 78,414 | 4/1929 | Shively | 152/209 R |
| D. 213,245 | 1/1969 | Newman | D12/149 |
| D. 246,364 | 11/1977 | Candiliotis | D12/151 |

FOREIGN PATENT DOCUMENTS

| 333776 | 10/1958 | Switzerland | 152/209 R |
| 1412351 | 11/1975 | United Kingdom | 152/209 R |

Primary Examiner—Albert J. Makay
Assistant Examiner—Lawrence E. Williams
Attorney, Agent, or Firm—Charles A. Blank

[57] ABSTRACT

A pneumatic radial tire in which the oblique pulling effect due to the structure of the tire is substantially eliminated and which has substantially improved stability in maintaining a rectilinear course. The tread has circumferentially oriented rows of lugs oriented along intersecting convexly curved approximately V-shaped reference lines running substantially transversely to the circumferential center line. The tips of the reference lines point in opposite directions on either side of the circumferential center line.

8 Claims, 8 Drawing Figures

PNEUMATIC RADIAL TIRE

The invention relates to pneumatic vehicle tires of the radial carcass design with a belt-like reinforcement between the tread and the crown of the carcass, the tread comprising a profile pattern having circumferentially oriented rows of profiled blocks or lugs that are laterally defined in the tread area between the tire shoulders by a profiled groove oriented a continuous zigzag pattern along the circumferential central line and at least two profiled grooves oriented bilaterally spaced apart therefrom in a continuous zigzag pattern in circumferential direction.

It is known to design the grooves defining the profile blocks in circumferential direction to have in the central area of the tread a different slope to the circumferential direction than in the area of the tread edges, where, as a rule, the profiled grooves predominate in the central area of the tread that are circumferentially oriented or that form only an acute angle with respect to the circumferential direction whereas, in the marginal area of the tread, the profiled grooves form a considerably larger angle with the circumferential direction. In order to achieve in the process a more uniform tread through the use of one single type of profiled groove and, as a result, a more uniform wear, it is known in the art to orient the profiled grooves to run from one edge of the tread to the other one along a substantially S-shaped lone so that the angle to the circumferential direction is being altered from the edges to the tread center in the stated manner (cf. German Disclosure [DOS] 2,035,714). In that case, the profiled grooves or channels at the edges of the profile can terminate in the circumferentially oriented zigzag-shaped grooves. As a result of this design, there is produced in the central area of the tread a brick-like pattern oriented at an acute angle of the tread where, into each row of "bricks", there enter with their tapered ends profiled blocks with a finger-like bend, proceeding from the edges of the profiles. To improve their springiness, said finger-like profiled blocks can be provided with fine lamella like incisions.

Profile patterns are furthermore known for pneumatic vehicle tires arranged asymmetrically and in pairs to the same vehicle axle, in which tires there extend from one marginal area to the other one profiled grooves that are exclusively oriented to be diagonally bent so as to achieve, in addition to effective traction, a resistance that, owing to the influence reciprocally exerted by the tires, is adequate to prevent a oblique pulling (cf. U.S. Pat. No. 2,154,290). Such tires of differing profile patterns and that can be used in pairs only have been unable to assert themselves in the market on account of their high cost.

The invention is based on the fact that radial tires with a belt-like reinforcement of the tread do, as a result of their design, generate a structurally conditioned lateral forces and a corresponding structurally conditioned moment. Such a moment exerts an effect on travel behavior even during the roll-off motion of the tire and reduces the stability of the tire in maintaining a rectilinear course, and increases the effect of oblique pulling of the tire. This holds true in particular with tread profiles having relatively wide profile grooves, like those tread profiles preferably used to cope with bad weather conditions in order to achieve improved drainage and to avoid the effect of hydroplaning.

It is the object of the instant invention to provide a new and improved pneumatic radial tire having tread profile, of the type described above in greater detail, such that it is possible substantially to eliminate the oblique pulling effect structurally conditioned with such tires, as well as its consequences on the behavior of the tire during travel, and to provide the tire with a substantially improved stability in maintaining a rectilinear course, accompanied by an improvement in the smoothness of running and reduced sensitivity to wear, i.e. in particular even with a tread profile having relatively wide profiled grooves and high drainage capability.

In accordance with the invention, this object is solved in that the profile blocks of the rows of blocks situated between the circumferential center line and the shoulders of the tire are respectively oriented, generally, along bird-wing-like bent V lines running substantially crosswise to the circumferential central line and are circumferentially defined by wide transverse groove sections oriented correspondingly bent, and that the tips of the bent V lines point into opposite circumferential directions on either side of the circumferential center line.

On the basis of this design, the blocks are defined in all profiled block rows in the area of the tread and, preferably, even in the profile sections extending into the sidewall area, in the direction of the circumference by arch-like bent edges that are preferably curved substantially according to an ellipsis equation. In that arrangement, the course of the curvature alternates abruptly on each half of the tread at least once between the circumferential center line and the shoulder, namely in the area of the tip of the V-shaped bird-wing-like directed line of orientation. In view of the fact that the tips of this line of orientation point into opposite circumferential directions along either side of the circumferential center line, one obtains a profile pattern that is preferably precisely radially symmetrical with respect to the circumferential center line of the tread. On the basis of the bird-wing-like orientation of the limiting edges, it becomes possible to allow the limiting edges to issue from or to lead into the area of the circumferential center line and into the area of the profiled shoulders at an angle between approximately 80° and 90° with respect to the circumferential direction, while said defining edges form in the area of the tip of the bird-wing-like reference line an angle between approximately 30° and 60° with the circumferential direction.

Preferably, in the tread area contributing to form the contact area between the tire and the road, the profile comprises four circumferentially oriented rows of profile blocks and, in the two respectively adjoining upper sidewall areas, in addition in each case another row of profile blocks. Even the profile blocks of the two profile blocks situated outside the normal area of contact between the tread and the road are transversely defined circumferentially by correspondingly bent edges, said blocks having limiting edges of a curvature opposite that of the adjoining defining edges situated in the area of the tread contact with the road.

As a result of this structure, one obtains blocks that are circumferentially predominantly defined by edges continuously bent in the shape of curves with said curvature having a predetermined orientation and, with regard to select areas of the width of the tread, predetermined angles with respect to the circumferential direction.

It was found that, as a result of this structure in the contact area of the tread with the ground, the profile is capable of taking up from the road a moment that, with regard to its magnitude and efficiency, is particularly advantageous, namely a moment that is capable of counteracting optimally the structure-conditioned moment inherent in said tire. As a result, the side slip effect otherwise brought about by the structure of the tire is practically completely compensated for so that one can achieve an excellent rectilinear stability.

In that arrangement, one achieves a particularly good drainage effect without affecting the rectilinear stability if each block of all rows of blocks is defined in its direction crosswise to the direction of circumference by two circumferentially continuous, zigzag-shaped relatively wide circumferential grooves. Said circumferential grooves may be oriented along their zigzag-shaped sections to be likewise arched. The marked edge pattern defining the blocks in circumferential direction is preserved even in those cases where, in the tread area proper, the profile blocks of the same row are designed to be circumferentially coherent as a result of bridge-like block sections. Such a cohesion can advantageously be brought about also in that the arched defining edges of the blocks of one and the same row are arranged to be broken off in their central area and the remaining edge sections are arranged to be circumferentially staggered with respect to one another so that the blocks of this row constitute a circumferentially meander-shape oriented, continuous, but markedly structured block. The curved defining edges constitute profile grooves of relatively substantial width that are oriented crosswise to the circumferential direction. Said cross grooves designed to follow in their orientation the bird-wing-like arched reference line can, in that arrangement, be transversely continuous or, preferably, be transversely discontinuous and constitute a branching of the profile grooves that improves decisively the drainage of the tread profile. It thus proved to be advantageous to design at least three and preferably four of the preferably five circumferentially continuous zigzag-shaped circumferential grooves in such a way that the transversely oriented arched groove sections emanate from the zigzag tips bilaterally in the form of branchings of the circumferential groove.

Figure 1B:
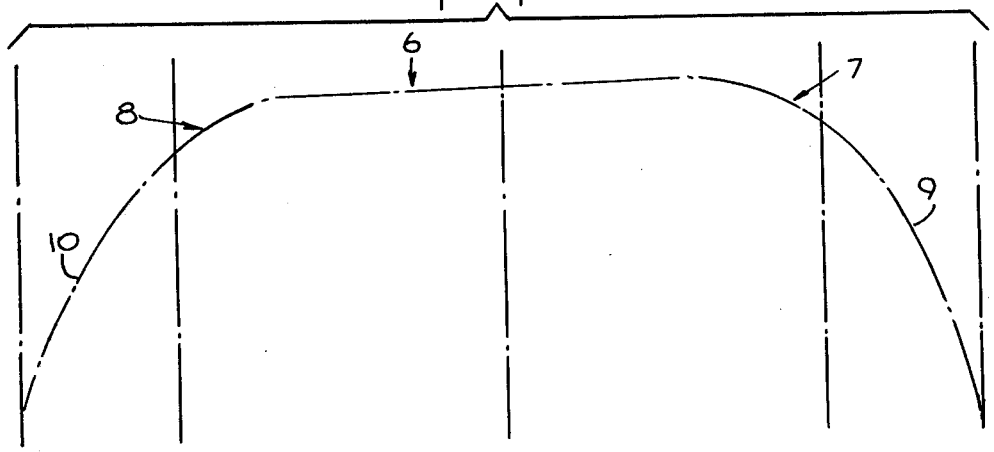
Figure 1C:
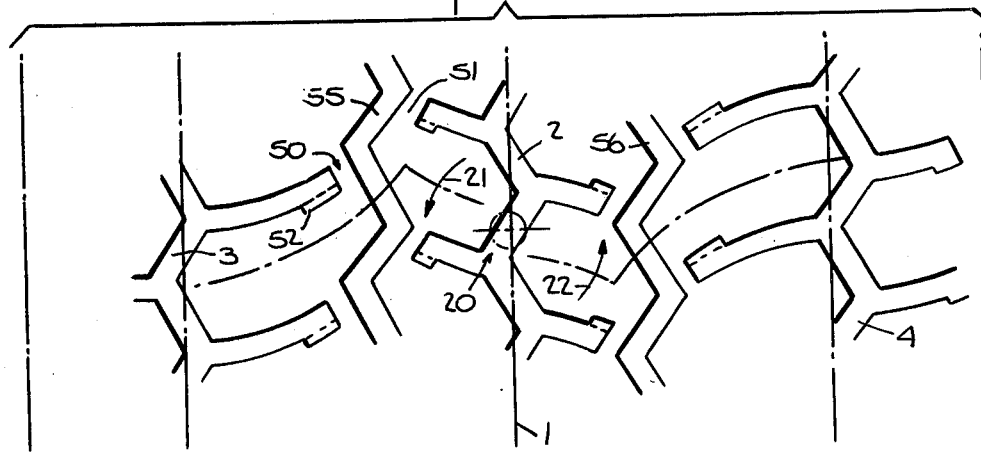
Figure 1D:
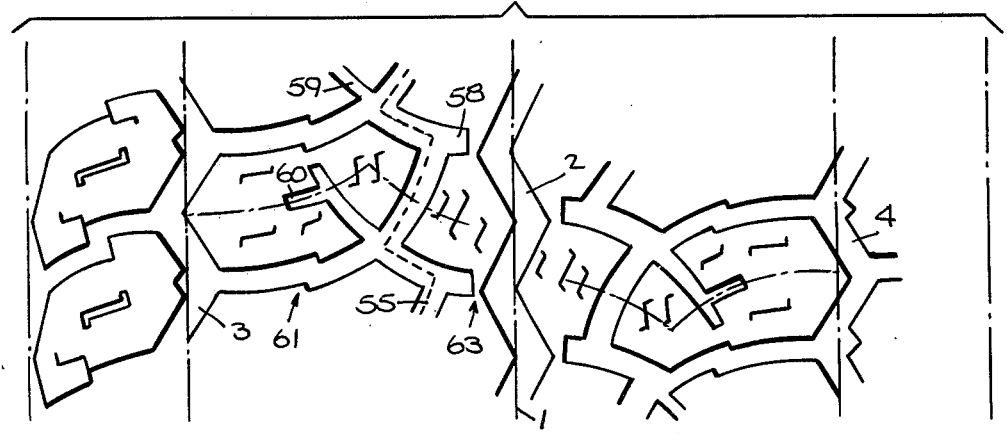
Figure 1E:
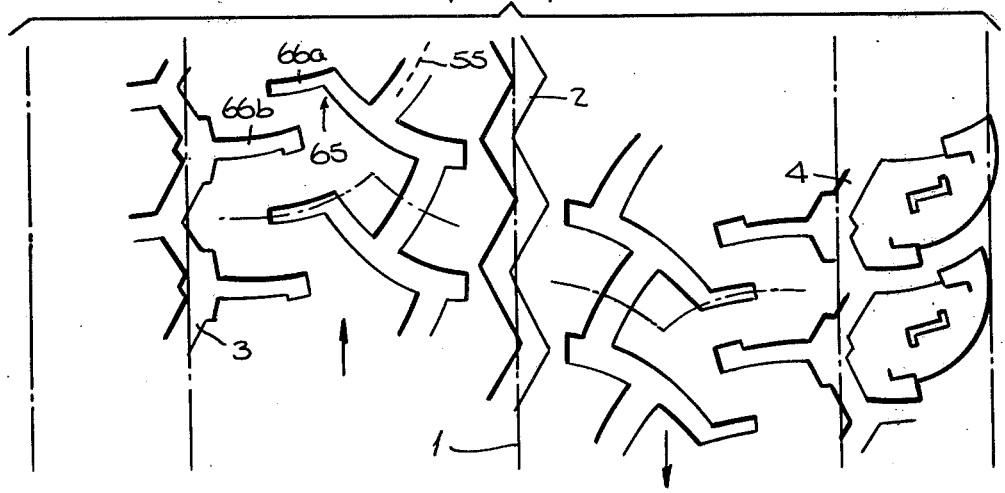
Figure 1F:
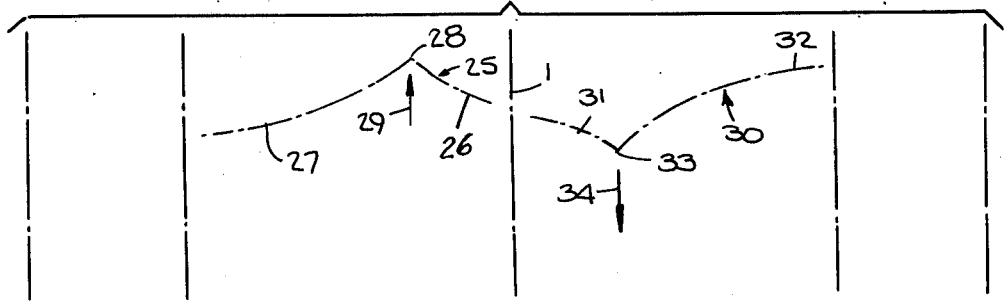
Figure 2:
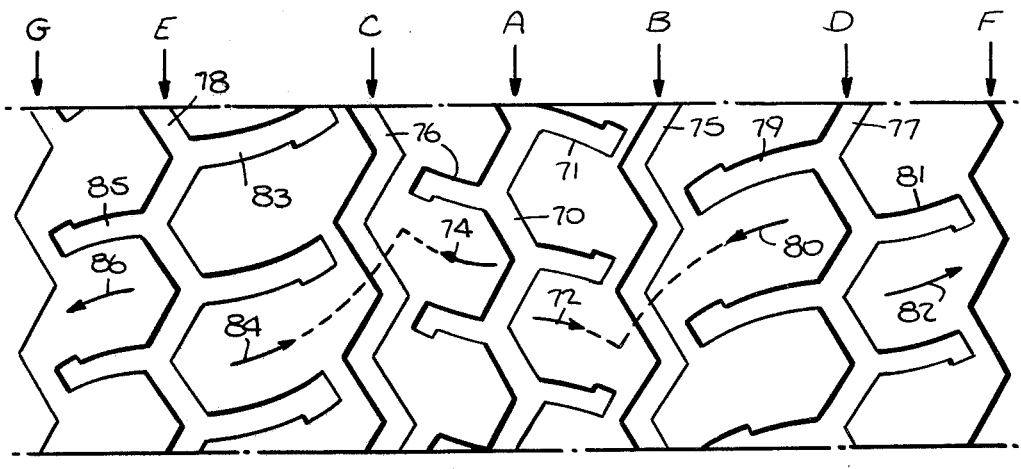

The invention is described below by means of several exemplified embodiments with reference to schematic drawings in which:

FIGS. 1a, 1c, 1d, and 1e represent in the form of segments and in simplified manner four different exemplified embodiments of the tread profile in accordance with the invention on a tire to be used preferably as a bad-weather tire hving excellent drainage action, FIG. 1b represents a dash-and-dot line the cross-sectional contour of the tire, FIG. 1f represents in dash-and-dot line reference lines described hereinafter, FIG. 2 represents in the form of a segment a profile pattern corresponding to FIG. 1c.

Figure 3:
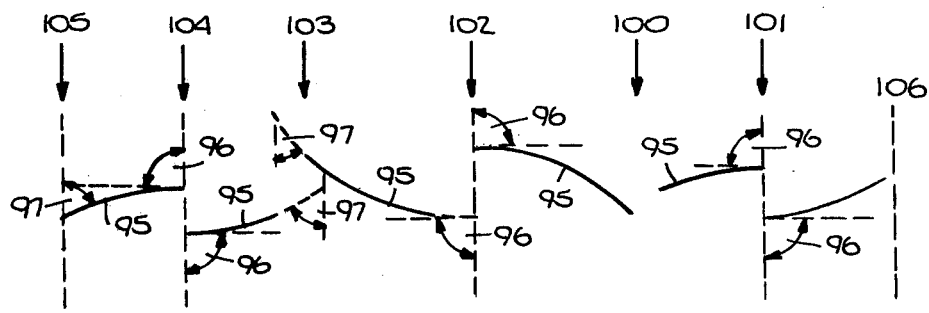
Figure 3:
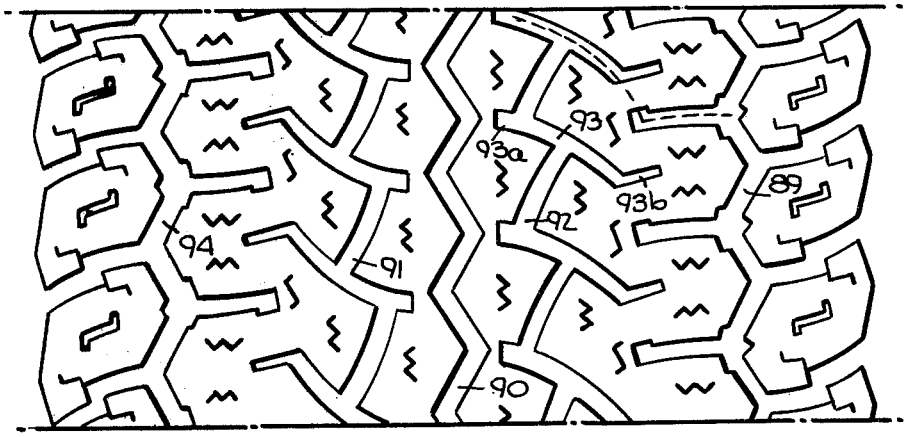

FIG. 3 is a particularly preferred pattern for the tread profile, already suggested in FIG. 1e.

The tread profile illustrated in the drawings is intended for a pneumatic vehicle tire having a radial carcass and a belt-like reinforcement between the crown of the carcass and the tread area, with the belt-like reinforcement consisting preferably of at least two reinforcement plies. As pointed out already above, such a tire displays a lateral force, conditioned by its structure, and a corresponding moment that do not disappear even in the course of travel of the tire on the road. The structure of such a tire is known in the art so that the tire itself has not been illustrated. In the case of the exemplified embodiments of a tread profile for such a tire it is assumed that the tire is endowed with a particularly favorable drainage action and, as a result, with increased reliability against the well-known effect of hydroplaning.

In FIGS. 1a, 1c, 1d and 1e, the circumferential center line of the various tread profiles reproduced in that drawing is designated by [the reference numeral] 1. All profiles consistently illustrate a continuous circumferential profiled groove 2 oriented in zigzag-fashion along the circumferential center line 1. The profile extends up into the upper sidewall areas of the tire. The normal area of contact of the tread profile with the road is defined in all exemplified embodiments by continuous profiled grooves 3 and 4 circumferentially oriented in zigzag fashion along the shoulder areas. For the purpose of ease of understanding as far as the tire contour is concerned, the cross-sectional contour is shown as a dash-and-dot pattern in FIG. 1b. The numeral 6 designates the central area of the tread, whereas the reference numerals 7 and 8 refer to the shoulder areas, and the references numerals 9 and 10 to the upper sidewall areas of the cross-sectional contour.

In the case of all exemplified embodiments illustrated in FIGS. 1a, 1c, 1d and 1e there are provided in the tread area of contact with the road four circumferentially oriented rows of profile blocks, (13, 14, 15, and 16 in FIG. 1a) while there is additionally provided in the upper sidewall area on each tire side one further row of profiled blocks (11 and 12, respectively in FIG. 1a). In the case of the four tread profiles differing from one another and reproduced in FIG. 1a, c, d, and e, the configuration of the block in the outer rows 11 and 12 is in each case suggested only on one side; this is the case for instance with regard to the profile block 17 in the block row 12 in FIG. 1a.

The elements essential for the travel behavior are, above all else, the blocks and the block rows 13 to 16 situated in the area of contact of the tread with the road. As can be gathered from the drawings, the blocks of the adjoining rows of blocks that are situated side by side crosswise to the circumferential center line 1 are oriented substantially along a crosswise oriented arched zigzag line. Taking a closer look, one can however see that the blocks of the two rows of blocks respectively situated on the same side of the circumferential center line 1, in other words, the blocks 18 and 19 of the rows 13 and 14, respectively the blocks 18a and 19a of the rows 16 and 15 are oriented in each instance jointly along a bird-wing-like V-shaped bent line of blocks 18a and 19a of the rows 16 and 15 are oriented in each instance jointly along a bird-wing-like V-shaped bent line of orientation 25 and 30, respectively, and are circumferentially defined by edges that, at least sectionally, are oriented substantially parallel to said reference line. Each one of the reference lines 25 and 30 consists of a shorter wing section 26 and 31 in proximity of the circumferential center line 1 and an externally situated longer wing section 27 and 32, respectively. Both wing sections converge to form a wing tip 28 and 33, respectively. The bird-wing-like reference lines 25 and 30 define the profile of the tread, over the entire tread circumference. It can be seen that, in this arrangement, the tips 28 and 33 of the two reference lines point into opposite directions of the circumference as suggested by the arrows 29 and 34. It can furthermore be noted that, with all of the four exemplified profiles, the profiles are designed and arranged on either side of the circumferential center line 1 to be radially symmetrical with respect to said center line. Such a point of symmetry is suggested at the reference 20 in FIG. 1c. Upon rotating, in the plane of the tread, the profile around the fulcrum 20 according to the arrows 21 and 22 by 180°, the profiles will overlap again completely with their original position. This radial symmetry is also continued in like manner over the entire tread circumference.

Preferably and realized in the case of all exemplified embodiments of FIG. 1, the two rows of profile blocks are separated from one another on each side of the center line 1 by another circumferentially continuous zigzag-shaped profiled groove 55 and 56. This means that, preferably, each one of the rows of blocks is defined in the area of the road contact of the tire and in the direction of both axial sides in each case by one circumferentially oriented continuous, zigzag-shaped profiled groove.

The wing sections 26, 27 and 31, 32 preferably follow curves corresponding to an equation of an ellipsis.

In the case of the exemplified embodiment according to FIG. 1a, one obtains a circumferentially and crosswise cohesive network of relatively wide profiled grooves where the profiled grooves are circumferentially defined by the zigzag configuration and the transverse profiled grooves by the bird-wing-like arch-shaped configuration. The circumferential grooves are the grooves 2, 3, 4, 55 and 56, whereas the arch-shaped transverse grooves for the two rows of blocks on each side of the center line are referred to by the numerals 40, 41 and 42, 43, respectively. It can be seen that at least the sections of the zigzag-shaped circumferential groove 55 are tangential extensions of the arch-shaped transverse grooves 40 to 42. The arch-like limiting edges 44 and 45 of the blocks 17 situated in the sidewall area 12 are, by comparison with the archlike groove sections 40 and 41 of the adjacent row 13 adjoining the adjacent circumferential groove 3, convexly bent in opposite direction. This is correspondingly true for the other half of the tread profile on the other side of the center line 1.

The tread profile according to FIG. 1c differs from the one described above essentially in that the blocks of the four rows of blocks situated in the area of tire contact with the road are circumferentially interconnected by means of narrow block "bridges" 50 and 51. Thus, the arch-like transverse grooves terminate freely in the block profile and may have groove enlargments in proximity of their terminal points as suggested by the reference numeral 52.

Whereas, in the exemplified embodiment according to FIG. 1c, the crosswise oriented profiled grooves are broken off shortly before reaching the zigzag-shaped circumferential groove 55 and 56, respectively, the point of discontinuity is situated in the case of the exemplified embodiment according to FIG. 1d in immediate proximity, at 63, of the circumferential profiled groove 2 running along the circumferential center line 1. In the case of this exemplified embodiment, as well as with the exemplified embodiment according to FIG. 1e, the various sections of the circumferential profile grooves 55, 56 display, depending on their orientation, a smaller or a greater slope with respect to the circumferential direction and constitute practically, as in the case of the exemplified embodiment according to FIG 1a, arch-like extensions of the transverse grooves that limit the profile blocks in circumferential direction and that are oriented according to the wings of the bird-wing-like reference line. In the case of the exemplified embodiment according to FIG. 1d, the transverse groove assigned to the row of blocks 14 penetrates deeply and in a branched manner, as suggested at 60, into the adjoining block of the row of blocks 13. The arch-like transverse grooves defining the blocks of the row of blocks 13 are, as suggested at 61, kinked or, without being interrupted, indicate a displacement in circumferential direction.

As illustrated in FIG. 1e, this displacement can result also in an interrupting of this transverse groove, as indicated at 66a and 66b in FIG. 1e, in such a way that the profile blocks of the profile row 13 form a solidly structured profile line that, meander-shaped, is circumferentially continuous as suggested at 65.

Through the breaking off of the transverse grooves, as well as through the extension and branching of the transverse grooves, in the same way as through the displacement of the transverse groove sections in circumferential direction, one achieves an increasing structuring of the block profile.

FIGS. 2 and 3 illustrate once again particularly typical exemplified embodiments of the new tread profile.

In FIG. 2, the letter A reproduces the center of the tread profile, whereas the profile edges are designated by the letters F and G. The letters D and E designate substantially the normal border of the area of contact of the tire with the road, whereas the letters B and C designate substantially central central areas on each side of the center of the tread profile. The profile shown according to FIG. 2 illustrates five circumferential grooves of relatively large width oriented continuously in zigzag formation in circumferential direction. The circumferential groove 70 is oriented along the circumferential center line. The grooves 77 and 78 are circumferential grooves at the limits of the normal area of contact of the tire with the road, whereas the circumferential grooves 75 and 76 are arranged substantially in the central area of the tread. In this way one obtains in transverse direction four separate circumferential rows of block profiles with all blocks being circumferentially defined by arch-like edges with the arches being oriented from row to row according to reference lines 72, 74, 80, 82, and 84, 86 of different curvatures. The curvature of the reference lines corresponds substantially to the equation of an ellipsis.

In the case of the exemplified embodiment according to FIG. 2, there are therefore produced two circumferential grooves 75, 76 that are in no way connected with the transverse grooves, as well as zigzag-shaped circumferential grooves 75, 76; from the toothed tips of which circumferential grooves 70, 77, 78 there emanate transverse groove sections bent in each case in opposite direction and thereby forming lateral branchings of the said circumferential grooves 70, 77, and 78.

FIG. 3 illustrates a preferred embodiment of the new tread profile. By way of difference with respect to FIG. 2, it is only the circumferential groove 90 oriented in zigzag formation along the longitudinal center line 102 that is without any connection with the system of transverse grooves. The other four zigzag-shaped circumferential grooves 89, 91, 92, and 94 are however circumferential grooves branched with transverse profile sections. Even in this case, the bird-wing-like reference line is being maintained for the curvature of the transverse grooves and for the limiting edges of the blocks as suggested by the wing sections 95 above the tread pattern in FIG. 3. The normal profile of the area of contact of the tire with the road is defined by the lines 101 and 104. It can be seen that in these areas, as well as in the area of the circumferential center line 102, the wing sections 95 enter at an angle 96 between about 80° and 90° to the circumferential direction. The tips of the wings are situated substantially in the areas referred to by the numerals 100 and 103. Into these areas as well as into the outermost marginal areas 105 and 106 of the profile there enter the arch-like wing sections 95 at an angle 97 between about 30° and 60° to the circumferential direction.

The zigzag-shaped circumferential grooves branched by transverse grooves in each case and situated on either side of the circumferential center line 102 are circumferentially staggered with respect to one another in such a way that the row of block profiles adjoining the tire shoulder and situated in the tread area extends circumferentially continuously as a meander-shaped profile line, whereas the groove sections defining the pertinent block sections in circumferential direction terminate in each case in the profile and, as a result of the staggering, nest in one another.

In the case of all exemplified embodiments there are produced in the area of the tread normally in contact with the road larger blocks in the tire shoulders, which blocks are defined by longer arch-like transverse grooves and, in proximity of the tread center, smaller blocks defined by correspondingly shorter, bent transverse grooves. As a result of the branching of the circumferential grooves and the staggering of the cross groove sections in circumferential direction, one obtains in the case of the exemplified embodiment according to FIG. 3 a particularly finely structured profile pattern with a pronounced drainage effect and accompanied by a maintaining of the improved rectilinear travel stability as a result of the arched edges defining the blocks in circumferential direction. Owing to the fine structure and the alternating course in the curvature of the limiting edge, one achieves also a considerably improved noise suppression. As a result of the structured design of the block in accordance with FIG. 3, one achieves furthermore a very high resistance to wear. On the basis of the structure, likewise as a result of the circumferential grooves, one achieves moreover a profile exerting also a favorable effect with regard to travel comfort.

Pneumatic vehicle tires having a belt-like reinforcement of the tread and on which the invention is implemented can be constituted, with regard to the belt, preferably out of at least two individual belt plies or out of one folded belt ply. Said plies can be made out of identical or different materials, for instance preferably out of steel cord or steel fabric, fiberglass plies or fabrics made out of organic polyamide fibers or similar nonmetallic materials.

I claim:

1. A pneumatic radial tire having carcass and tread portions, said tread portion comprising a profile pattern with circumferentially oriented rows of profile lugs which are defined laterally between the tire shoulders by one profile groove oriented in zig-zag form along the circumferential center line of the tire and by two profile grooves oriented in zig-zag form circumferentially continuously on each side of and spaced apart from the circumferential center line, said lugs of said rows being oriented along intersecting convexly curved approximately V-shaped reference lines running substantially transversely to said circumferential center line and said lugs being circumferentially defined by convexly curved cross groove sections, the tips of said reference lines pointing in opposite directions on either side of said circumferential center line.

2. A tire in accordance with claim 1 in which in the area of the tread normally in contact with the road there are provided in each case pairs of circumferentially oriented rows of lugs on either side of said circumferential center line and each row of lugs is bilaterally defined by circumferentially continuous zig-zag shaped circumferential grooves.

3. A tire in accordance with claim 1 in which the extremities of said reference lines terminate in the shoulder and in proximity of said circumferential center line substantially parallel to the axis of the tire by forming an angle between about 80° and 90° with respect to the circumferential direction.

4. A tire in accordance with claim 1 in which said reference lines originate from their tips at an angle between about 30° and about 60° with respect to the circumferential direction.

5. A tire in accordance with claim 1 in which said lugs of at least of the two lug rows immediately adjoining said circumferential center line respectively join one another by lug-crossing bridges within the same row.

6. A tire in accordance with claim 1 in which said cross groove sections are substantially parallel to said reference lines and originate individually in the form of lateral branchings from the tips of respectively a zig-zag-shaped circumferential groove and terminate in truncated fashion in the lug of an adjoining row of lugs.

7. A tire in accordance with claim 6 in which said groove sections substantially parallel to said reference lines and originating individually as a branching from a zig-zag-shaped circumferential groove are staggered with respect to one another in circumferential direction.

8. A tire in accordance with claim 7 in which the defining edges of profile grooves and profile lugs parallel to said reference lines are predominantly curved according to an equation of an ellipse.

* * * * *